United States Patent [19]
Simmons

[11] Patent Number: 5,582,134
[45] Date of Patent: *Dec. 10, 1996

[54] ANIMAL WASTE DISPOSAL APPARATUS HAVING ROTATABLE SIEVE AND METHOD

[76] Inventor: Harlan M. Simmons, 18658 George Washington Dr., Southfield, Mich. 48075

[*] Notice: The term of this patent shall not extend beyond the expiration date of Pat. No. 5,410,987.

[21] Appl. No.: 431,112

[22] Filed: Apr. 28, 1995

Related U.S. Application Data

[63] Continuation of Ser. No. 199,560, Feb. 22, 1994, Pat. No. 5,410,987.

[51] Int. Cl.⁶ ..................................................... A01K 1/01
[52] U.S. Cl. .......................................... 119/166; 119/165
[58] Field of Search ..................................... 119/165, 166, 119/167, 168, 169, 170, 161, 61; 209/417

[56] References Cited

U.S. PATENT DOCUMENTS

| | | |
|---|---|---|
| 1,416,022 | 5/1922 | Hartley . |
| 2,530,124 | 11/1950 | Kieckhefer . |
| 2,765,772 | 10/1956 | Inman . |
| 2,963,003 | 12/1960 | Oberg et al. . |
| 2,971,493 | 2/1961 | Robb . |
| 3,100,474 | 8/1963 | Schneider . |
| 3,141,441 | 7/1964 | Russell . |
| 3,233,588 | 2/1966 | Thomas . |
| 3,752,120 | 8/1973 | Pallesi . |
| 3,796,188 | 3/1974 | Bradstreet . |
| 3,818,865 | 6/1974 | Sinclair . |
| 3,827,401 | 6/1974 | Franzl . |
| 3,831,557 | 8/1974 | Elesh ........................................ 119/170 |
| 3,908,597 | 9/1975 | Taylor . |
| 3,990,397 | 11/1976 | Lowe, Jr. . |
| 4,190,525 | 2/1980 | Menzel ..................................... 119/166 |
| 4,217,857 | 8/1980 | Geddie . |
| 4,359,966 | 11/1982 | Casino ..................................... 119/166 |
| 4,646,684 | 3/1987 | Embry . |
| 4,766,845 | 8/1988 | Bavas . |
| 4,802,442 | 2/1989 | Wilson ..................................... 119/166 |
| 4,817,560 | 4/1989 | Prince et al. . |
| 4,949,678 | 8/1990 | Demko . |
| 5,109,800 | 5/1992 | Williams . |
| 5,193,488 | 3/1993 | Walton ..................................... 119/166 |
| 5,293,837 | 3/1994 | Caldwell . |
| 5,341,763 | 8/1994 | Bondurant, III ....................... 119/166 |

FOREIGN PATENT DOCUMENTS

| | | |
|---|---|---|
| 259293 | 3/1988 | European Pat. Off. ............... 119/166 |
| 2345698 | 6/1974 | Germany . |
| 2509125 | 9/1976 | Germany . |

*Primary Examiner*—Todd E. Manahan
*Attorney, Agent, or Firm*—Harness, Dickey & Pierce, P.L.C.

[57] ABSTRACT

A method and apparatus for disposing of animal waste. The method includes using a receptacle which receives animal litter. A sieve is placed within the receptacle to rest therein beneath the animal litter. The sieve includes openings sized to allow particulates to pass therethrough but to impede the passage of solid waste therethrough. To remove the solid waste, the sieve is lifted from the receptacle and turned or otherwise positioned to allow the waste to fall there off of. The apparatus includes a waste-guiding device which fits over the receptacle to define an opening to help in guiding the animal to deposit waste in the receptacle. The waste-guiding device, in one embodiment, is formed in two semi-circular portions with each being hingedly secured to the receptacle.

21 Claims, 2 Drawing Sheets

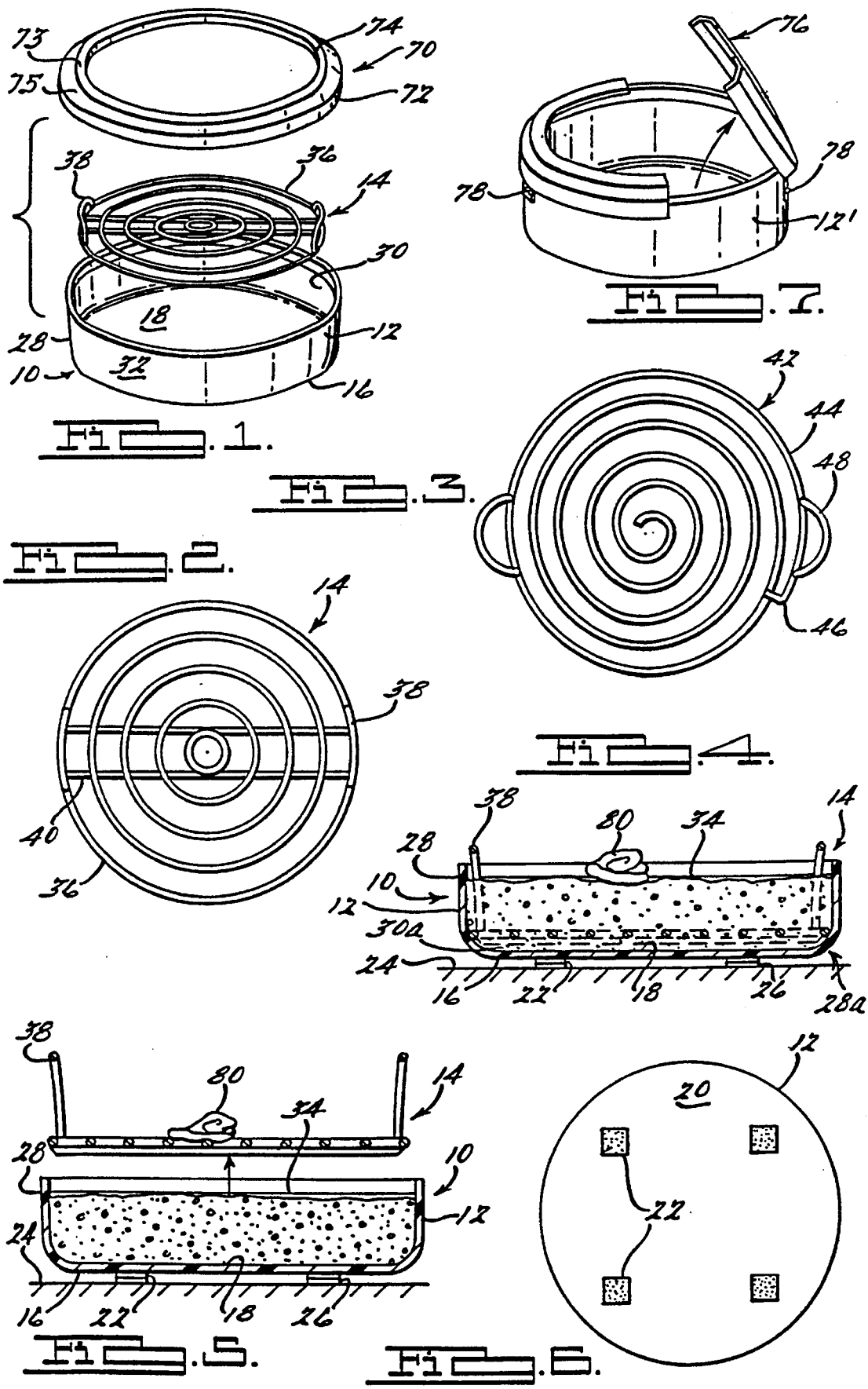

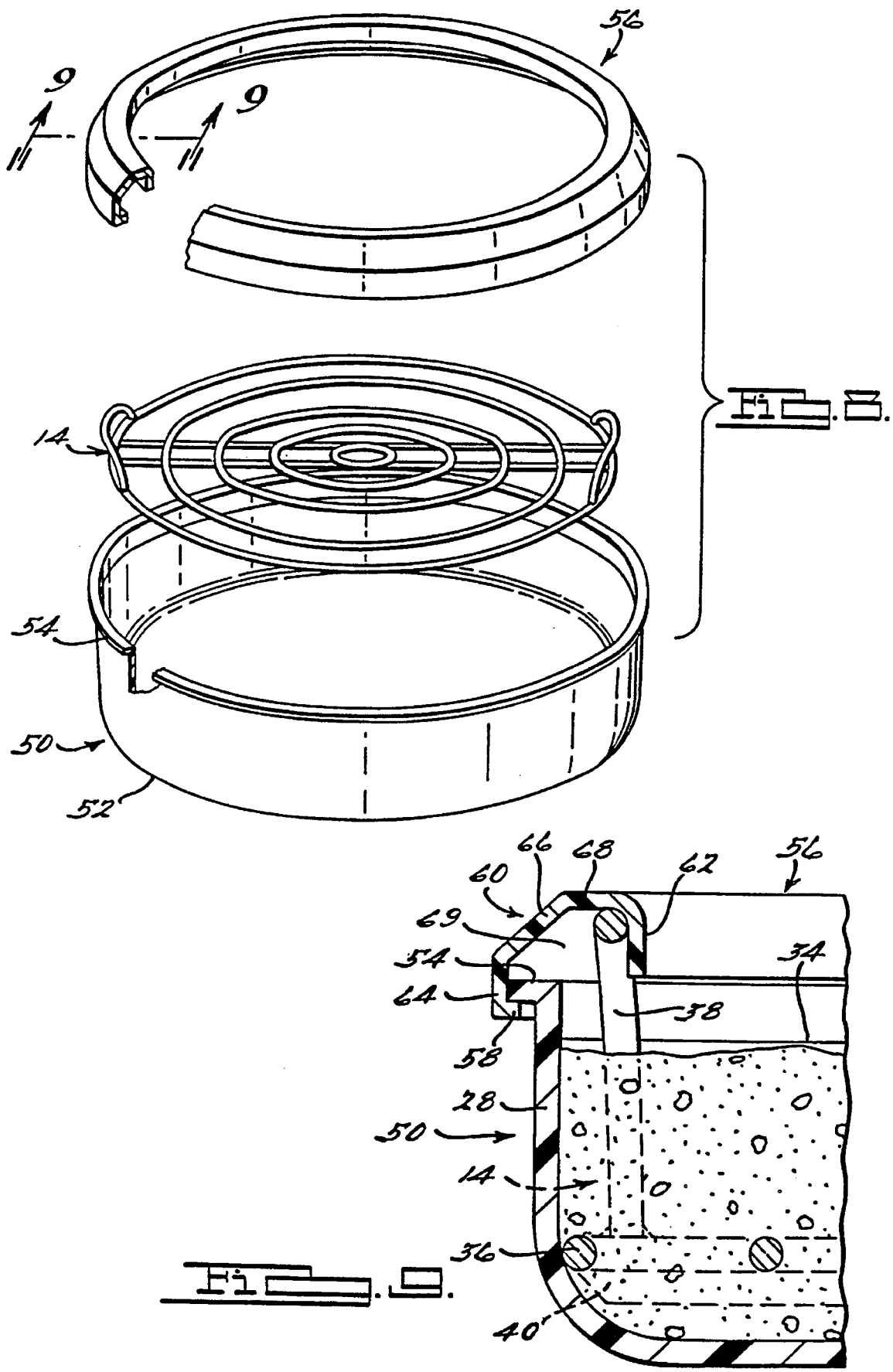

ANIMAL WASTE DISPOSAL APPARATUS HAVING ROTATABLE SIEVE AND METHOD

This is a continuation of U.S. patent application Ser. No. 08/199,560, filed Feb. 22, 1994 now U.S. Pat. No. 5,410,987.

BACKGROUND OF THE INVENTION

1. Technical Field

The present invention relates to an animal waste disposal system, and particularly a system for disposing of solid cat waste containing materials.

2. Discussion of the Related Art

A variety of systems exist for the collection of animal waste. A classic example of such a system is the cat litter box. In conventional systems, an open box structure is provided into which a cat litter is introduced. A cat will thereafter deposit its waste (e.g., urine, feces, or both) onto the litter. Since many cats bury their wastes, there is often no urgency for removal of the waste. Thus, it is often the practice to wait a period of time and then dispose of the resulting mixture of litter and waste using conventional methods, such as by dumping all of the litter and waste mixture into a plastic trash bag. Such a technique, despite its long acceptance, has various disadvantages. For instance, lengthy delays before dumping often result in undesirable odors. Moreover, cat litter will potentially be consumed in large amounts, particularly for persons who frequently dump the mixture of litter and waste. In this regard, the associated usage of plastic trash bags may be undesirable from an environmental perspective, in view of increasing concerns for the lengthy degradation periods needed for plastics in landfills, and the volumes occupied from such disposed materials.

In an alternative waste disposal system, a ladle, shovel, or scooper instrument may be employed to scoop out waste containing materials from a litter box. This offers an advantage in that the entire contents of the litter box need not be dumped at a single time to accomplish disposal. However, it has been observed that upon scooping, a substantial amount of litter is removed, which litter has not come into contact with any waste containing material. Accordingly, using this technique still results in a relatively large consumption of litter over a period of time.

In another waste disposal process, a three box system is employed that includes two solid bottomed rectangular boxes (a first box and a second box) and a grated box or tray (having a mesh structure defined in it) that purports to sift out waste and hardened litter. This arrangement is disclosed in U.S. Pat. No. 4,217,857 and commercially marketed under the name "Lift n' Sift®". With this system the tray is lifted from the first box when the first box contains waste. The waste can then be removed on the tray. After disposal of the waste on the tray, the tray is placed into the second box, and litter (such as from the first box) is poured into the combination. This type of arrangement suffers disadvantages, however, because litter must be added to the combination, or transferred between boxes (thereby increasing the potential for mess) after each waste disposal. To avoid having to dispose of litter with each waste disposal, and to permit for reuse of litter, such adding or transferring requires the use of both the first and second boxes, in addition to the tray.

SUMMARY OF THE INVENTION

The above discussed disadvantages are overcome by the present invention, which is predicated upon the discovery of an apparatus, method, and system for disposing of animal waste, which involves employing a single receptacle for holding a litter material, into which an animal deposits a waste, and a sieve employed in cooperation with the receptacle for filtering the litter and also removing the animal waste.

Employment of the apparatus and method of the present invention results in efficient animal waste disposal, wherein only a single receptacle is needed, relatively little litter is removed from the system upon waste removal, and no litter transfer between a plurality of receptacles is required for waste disposal. Further, the method and apparatus is relatively easy to operate and facilitates more frequent waste removal, thus potentially reducing the amount of odor attendant with the waste.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings:

FIG. 1 is an exploded perspective view of one preferred embodiment of the apparatus of the present invention.

FIG. 2 is an overhead view of one preferred embodiment of a sieve of the present invention.

FIG. 3 is an overhead view of another preferred embodiment of a sieve of the present invention.

FIG. 4 is a cross-sectional view of an embodiment of the apparatus of the present invention.

FIG. 5 is a cross-sectional view of the embodiment of FIG. 4 in use.

FIG. 6 is a plan view of a bottom surface of a base of a receptacle employed in an embodiment of the apparatus of the present invention.

FIG. 7 is a perspective view of an alternative preferred embodiment of the apparatus of the present invention.

FIG. 8 is an exploded perspective view of another alternative preferred embodiment of the apparatus of the present invention.

FIG. 9 is a fragmentary cross-sectional view of the apparatus of FIG. 8 taken across line 9—9, with the apparatus of FIG. 8 assembled for use.

DETAILED DESCRIPTION OF THE PREFERRED EMBODIMENT

Referring to FIGS. 1 and 4, the present invention is based on the discovery of a new animal waste disposal apparatus 10 and a method and system for disposing of animal waste. The animal waste disposal apparatus 10 includes a receptacle 12 for receiving animal waste, and a sieve 14, which fits in the receptacle 12 for removing animal waste from the receptacle 12.

The receptacle 12 is generally a bowl or a pan and has a base 16, which has a top surface 18, and a bottom surface 20 (as shown in FIG. 6). On the bottom surface of the base 16 there are a plurality of feet 22, which serve to elevate the base slightly above a rest surface 24 (shown in FIGS. 4 and 5) upon which the receptacle rests during use, to thereby reduce potential marring or scratching of both the bottom surface of the base 16 and the rest surface 24. The feet 22 may be rubber feet that are attached to the base in any suitable manner (e.g., by glue, screw or rivet). They may also be integrally fabricated into the base such as by stamping, molding or any other suitable technique. In one preferred embodiment, as shown in FIGS. 4 and 5, the feet include either a hook portion or a loop portion of a hook and loop fastener system 26, such as is available under the name VELCRO®. The remaining portion of the hook and loop fastener system 26 is attached to the rest surface 24, opposite the portion of the hook and loop fastener on the feet 22, for removably securing the base 16 to the rest surface 24.

It is possible, however, that other structures may be employed to achieve the same result as the feet 22. For instance, a plurality of ribs or a ring may be added to or integrated into the base 16 of the receptacle 12 in accordance with the above.

Referring again to FIG. 1, projecting generally away from the base 16 of the receptacle 12, and preferably in a generally upward direction is a wall 28. The wall 28 preferably is continuous about the periphery of the base 16 to substantially encircle the base and includes a rounded corner portion 28a preferably integrally formed with the base 16, as shown particularly well in FIG. 4. Of course, the wall may lie slightly within the periphery of the base. The wall has an inner surface 30 and an outer surface 32. Either or both of the inner surface 30 or outer surface 32 may contain a marking 34, either one or more discrete marks or a continuous mark, to approximately denote a desired level to which the receptacle 12 should be filled with an animal litter material. The receptacle 12, in use, will receive the sieve 14 and a predetermined quantity of an animal litter material. The angle of the wall 28 relative to the base 16 is preferably at least 90°, and the radius of curvature of the corner portion 28a is sufficient to permit the outer periphery of the sieve 14 to substantially abut an inner surface 30a of the corner portion 28a and to be supported thereby when the sieve 14 is placed in the receptacle 12. The angle of the base 16 further permits the sieve 14 to be readily removed from the receptacle 12 for service, without leaving substantial amounts of animal waste in the receptacle 12, such as may be found adjacent the inner surface 30 of the wall 28.

It should be appreciated that the receptacle is illustrated, in the drawing of FIG. 1, 4 and 5, as a generally cylindrical structure having one open end, this being the preferred embodiment for efficient practice of the present invention. It will be appreciated, however, that various other shapes of the receptacle are possible. Further, the size of the receptacle and the radius of curvature of the corner portion 28a may vary and will be governed typically by such factors as the size of the animal to use it, space limitations, desired frequency of waste removal, or the like.

In a preferred embodiment the receptacle 12 is a unitary structure formed either from a single piece of a generally liquid impervious plastic or metal material having any suitable thickness. For example, a drawn, stamped or otherwise plastically deformed metal structure may be employed. Any other suitable forming technique may be employed in the alternative. Suitable metals preferably include generally corrosion resistant materials such as a stainless steel, aluminum or any other suitable material. If the material is a plastic, it can be a suitable thermoplastic material, which is fabricated using any suitable conventional technique, such as, without limitation, injection molding, thermoforming, or the like. Of course, other materials (e.g., without limitation, thermosetting plastic materials) and forming techniques may be employed. Further, it is possible to prepare the receptacle 12 from two or more separate pieces of material (e.g., a first piece for the wall, and a second piece for the base), which can be joined together in any suitable manner.

The sieve 14 permits animal litter material to pass through it but not an animal waste containing material. Further, the sieve 14 readily permits for reinsertion of the sieve 14 into the receptacle 12, when the receptacle 12 contains an animal litter material, thereby avoiding the need to remove the animal litter material from the receptacle 12 prior to reinsertion. As used herein, "animal litter material" refers to litter materials such as particulated cat litters, which are commercially available under a wide variety of product names. As used herein "animal waste containing material" refers to animal feces. It also refers to a solid agglomeration of material that includes animal feces and/or a liquid animal waste, such as urine, a runny bowel movement, or vomit. Such agglomeration is obtainable using many commercially available animal litters, which also are particulated materials. Without limitation, examples of such commercially available litters include Tidy Cat®, Scoop Away®, Natural Select®, and Premium Choice®. In use, when a plurality of proximately disposed particulates of these commercially available litters come into contact with a liquid, the liquid effectively bonds the particulates together to form an aggregation that contains the liquid. The resulting aggregation can be handled and disposed of as a mass of generally solid material. It will also be appreciated that the embodiments of the present invention are also useful with various non-agglomerating cat litters.

In a particularly preferred embodiment shown in FIG. 2, the sieve 14 employed in the apparatus and process of the present invention preferably is formed from a plurality of wires 36 or rods (e.g., having a generally circular cross section, though other shapes are possible). The sieve 14 has at least one handle 38, and preferably (as shown in FIGS. 1–5) two handles.

Specifically, the sieve 14 includes a plurality of wires 36, each deformed generally to the shape of a circle, with each circle of wire having a different predetermined diameter relative to each other circle. The wires 36 are fixedly secured such as by tack welding, brazing or otherwise joining to one or more cross members 40 to form a rigid, unitary member.

The wires 36 preferably are arranged in a single plane relative to each other and spaced to result in a plurality of concentric circles. Of course, shapes other than circles are possible as well, as are configurations where the wires 36 and cross members 40 are arranged in a plurality of planes.

In an alternative preferred embodiment of FIG. 3, a spiral sieve 42 is formed from a single length of a spirally formed wire 44, which can be used in place of the sieve 14 in the various preferred embodiments of the present invention. For reinforcement, preferably at least a terminal end 46 of the wire 44 or rod is connected to an inner winding of the sieve, as shown in FIG. 3 in any suitable manner. Each winding of the spiral may be in the same plane relative to the other windings or it may be in a different plane. The spiral sieve 42 also has one or more handles 48 like the handles 38 of the sieve 14.

With respect to both of the above embodiments of the sieve 14 and spiral sieve 42, shown respectively in FIGS. 2 and 3, a spacing of a predetermined radial distance is maintained between each circle (for the sieve 14 of FIG. 2), and between each winding of wire or rod (for the spiral sieve 42 of FIG. 3). The spacing distance is sufficient to permit to pass therethrough (both upon removal of the sieve 14 or spiral sieve 42 from the receptacle 12, and upon placement of the sieve 14 or spiral sieve 42 into the receptacle 12) particulates of animal litter that have not yet come into contact with animal waste. The spacing distance is also sufficient to prevent animal waste containing material from passing through the sieve 14 or spiral sieve 42 so that, upon removal of the sieve 14 or spiral sieve 42 from the receptacle 12, the sieve 14 or spiral sieve 42 can contact the animal waste containing material, and support it during removal from the receptacle and transportation of the waste containing material to a disposal site or apparatus. In a preferred embodiment, the wire is configured to attain a radial spacing distance between adjacent wires 36 (or between radially adjacent portions of the spirally formed wire 44) of up to about 2.5 cm, and more preferably up to about 1 cm, and still more preferably about 0.25 cm to about 1 cm, and even still more preferably about 0.25 cm to about 0.3 cm.

The wire or rod 36 or 44 employed in the sieve 14 or the spiral sieve 42 preferably is a metal or a plastic (as well as the cross members 40 shown in FIG. 2), though other materials are possible. Examples of preferred metals include steel or stainless steel. The wire or rod 36 or 44 may be coated with any suitable protective coating. For example, the metal may be plated (e.g., chrome plated) to help resist corrosion or wear. In one highly preferred embodiment the wire or rod has a cross-sectional diameter of about 0.5 mm to about 5 mm, more preferably about 0.5 mm to about 2.5 mm and still more preferably about 1 to about 1.2 mm. The wire or rod 36 or 44 optionally employs a thin coating (e.g., less than about 1 mm) of a material having a relatively low coefficient of friction, such as polytetrafluoroethylene (e.g., a material commercially available under the name TEFLON), to help resist sticking of the animal waste containing material to the wire or rod. Other suitable "non-stick" coatings may be employed in place of or in combination with the polytetrafluoroethylene. Further, other cross sectional shapes and diameters are possible.

Preferably the materials and configuration employed in the sieve 14 or spiral sieve 42 render them sufficiently strong and rigid so that they will not plastically deform in response to the stresses encountered during use in accordance with the apparatus and process of the present invention. Some elastic deformation is contemplated, and is tolerable. More specifically, the combination of wire spacing, cross sectional shape and size, and material selection is such that the sieve 14 or spiral sieve 42 can be rotated or twisted about an axis generally normal to the base of the receptacle (of the various embodiments herein) to cause the sieve 14 or spiral sieve 42 to penetrate through animal litter that is contained in the receptacle. The sieve 14 or spiral sieve 42 will elastically deform slightly but will not plastically deform or rupture under the stress. Further, without intending to be bound by theory, with the spiral sieve 42, the portion of the spiral that is subjected to the greatest stress likely will be toward the center of the spiral. Accordingly, it may be desirable to selectively reinforce that portion, to select a wire or rod material sufficiently strong to resist the stress, or even have the cross sectional shape or size differ from the portion of the spiral toward its outer periphery (e.g., have a thicker or more rigid cross section toward the center).

The handles 38 or 48 respectively of the sieve 14 or spiral sieve 42 may be integrally formed or they may be separate members that are joined or fastened to the sieve with any suitable fastening mechanism or technique. For example, they may be hingedly connected to the respective sieves or fixedly secured. Preferably the handles each have a portion that is disposed slightly above the top of the animal litter contained in the receptacle 12 when the sieve respective is positioned in its desired level in the receptacle 12. In FIGS. 4 and 5, the handles 38 are shown slightly above the top of the wall 28. In an embodiment when the handles are hingedly connected to the sieve, they may be lowered to below the top of the wall 28 of the receptacle 12 or maintained in a fully upright position. Alternatively, the handles 38 (or 48) could have a length which enables them to be disposed below the top of the wall 28.

As shown in FIGS. 1, 7, 8 and 9, the apparatus 10 of the present invention optionally includes an animal waste guiding device. Three different embodiments of the animal waste guiding device are depicted respectively in FIGS. 1, 7 and 8 (with the embodiment of FIG. 8 also being depicted in FIG. 9). In each embodiment, the animal waste guiding device helps to direct an animal or animal waste toward the center of the animal waste disposal apparatus 10 so that the animal waste will tend to deposit toward the center of the animal waste disposal apparatus 10. Additionally, it serves to deflect any stray waste away from the juncture of the base 16 and wall 28. In this manner the risk that animal waste will gather or get trapped at or near the juncture of the base 16 and wall 28 of the receptacle 12 is reduced.

The three embodiments depicted in FIGS. 1, 7 and 8 (also FIG. 9) each contain features that distinguish between the respective embodiments, but which can be combined with features from the respective embodiments to yield a structure not shown in the drawings, but which would still fall within the scope of the present invention.

Referring to FIG. 8, a first preferred alternative animal waste disposal apparatus 50 includes a receptacle 52 that is the same as the receptacle 12 except that it has an outwardly directed radial flange 54. A first animal waste guiding device is designated by reference numeral 56. The device 56 is generally annular, defining an opening therein through which animal waste can pass into the receptacle 52, and is adapted to snap fit about some or all of the periphery of the receptacle 52.

As shown in FIGS. 8 and 9, the first animal waste guiding device includes an inwardly disposed flange 58 for engaging the underside of the radial flange 54. The inwardly disposed flange 58 may be continuous about its diameter or may be segmented. It is possible, for instance that the inwardly disposed flange 58 is not continuous about the periphery (and thus defining a plurality of inwardly disposed projections), and neither is the radial flange 54 (i.e., defining a plurality of outwardly disposed projections) to permit a twist on or off action to position the first animal waste guiding apparatus 50 on or off the receptacle 52.

As shown in FIGS. 8 and 9, the inwardly disposed flange 58 is adjacent an intermediate portion 60 that, in turn, is adjacent a downwardly projecting wall 62. The intermediate portion 60, as depicted in FIGS. 8 and 9, includes an upwardly projecting portion 64 that terminates at one end of an inclined portion 66. The other end of the inclined portion 66, in turn, terminates at an upper portion 68. The intermediate portion 60, upper portion 68 and the downwardly projecting wall 62 cooperate to define a cavity 69 within which a portion of the handles 38 may be disposed when the waste guiding apparatus 56 is disposed on the receptacle 52.

The upper portion 68, as shown in FIGS. 8 and 9 is generally horizontal. However, in an alternative preferred embodiment, it is sloped downwardly toward the inner portion of the receptacle 52 like the embodiment shown in FIG. 1. At an end opposite the inclined portion 66, the upper portion 68 adjoins with the downwardly projecting wall 62. The dimensions and configuration of the first animal waste guiding device are selected to permit a snap-fit (or to permit twist-off as described previously) with the receptacle 52, and to accommodate any space needed for handles of the sieve 14, when the sieve 14 is placed in the receptacle 52. Preferably, the diameter of the opening defined in the first animal waste guiding device 56 is less than the diameter of the receptacle 52. Preferably, the first animal waste guiding device 56 is molded from a suitable plastic material. However, any other suitable material or fabrication technique may be employed.

Turning again to FIG. 1, a second animal waste guiding device 70 is shown. The device 70 includes a vertical wall 72 that adjoins an upper inwardly projecting flange 74 via a more pronounced sloping wall portion 75. The device 70 is configured to define a generally circular opening therein which, like the first device 56, has a diameter less than the diameter of the receptacle 12. The upper inwardly projecting flange 74 preferably slopes downwardly toward the inner portion of the receptacle 12. Of course, it may assume other configurations as well. The second device 70 also is configured and dimensioned, like with the first device 56 for covering the handles, and for readily permitting lift off of the second device 70 from the receptacle 12. Again any suitable material or fabrication technique may be employed (e.g., molding from a suitable plastic material) to make the second device 70.

FIG. 7 illustrates a third animal waste guiding device 76. The third device 76 generally resembles the second device 70 in configuration, fabrication material, and dimensions. However, the third device 76 is split into two portions. Each of the respective portions is connected to receptacle 12' such as by a hinge 78 (which may be added as a discrete structural element, or formed as an integral element such as by molding a plastic). This permits the third waste guiding device 76 to remain attached to the receptacle at all times.

Referring to FIGS. 4 and 5, by way of illustration in accordance with the method, apparatus, and system of the present invention, animal waste removal and disposal is accomplished by placing the receptacle 12 on the rest surface 24, preferably so that the feet 22 of the receptacle are substantially secured to the rest surface 24 (e.g., by use of a hook and loop fastener 26 as discussed previously). The receptacle 12 is filled to a desired level with a suitable amount of animal litter material. In a preferred embodiment, the animal material is a cat litter material, suitable for coming into contact with a cat waste.

As shown in FIG. 4, the sieve 14 is placed in the receptacle toward the base 16 of the receptacle 12, and is covered with the animal litter material. The sieve 14 is placed in the receptacle (in which there is animal litter present) by grasping the handles and applying a force directed toward the base of the receptacle, such as by rotating the sieve 14 about an axis generally normal to the base of the receptacle, and in a plane generally parallel to the base 16 of the receptacle 12, to force the sieve through the animal litter material. The rotating may be a continuous series of clockwise and counterclockwise rotations wherein the sieve is rotated in one direction before the direction of rotation is changed, and the sieve is rotated in the opposite direction. Alternatively, the sieve is rotated in a single direction like a screw, without reciprocation. The rotating is done until the sieve 14 reaches its desired level within the receptacle, preferably in close proximity to the base 16 of said receptacle 12. It will be appreciated that the sieve 14 may be urged downwardly into contact with the inner surface 30a of the rounded corner portion 28a as shown in FIG. 4 but need not be inserted to this degree for the sieve 14 to operate properly. During the present rotating step, the hook and loop fasteners 26 on the feet secure the receptacle in a relatively fixed position.

Thereafter, an animal (e.g., cat) can deposit waste in the receptacle, preferably with the guiding aid of an animal waste guiding device (such as discussed previously), onto the animal litter material (e.g., cat litter). An animal waste containing material 80 is removed from the receptacle 12 by grasping the handles 38 of the sieve 14 and lifting it from the receptacle 12 (See, FIG. 5). Rotating may be combined with the lifting to facilitate removal. Substantially all of the animal litter that has not come into contact with the animal waste will pass through the sieve, while the animal waste containing material (e.g., cat waste containing material) will be lifted out of the receptacle, on the sieve, and can be disposed of accordingly. The steps may then be repeated, and can be performed without having to empty all of the animal litter material from the receptacle to be able to place the sieve 14 into the receptacle 12.

Although the invention has been described with particular reference to certain preferred embodiments thereof, variations and modifications can be effected within the spirit and scope of the following claims.

What is claimed is:

1. An apparatus for disposing of waste from an animal, said apparatus comprising:

(a) a receptacle for receiving an animal litter material, said receptacle having a base and a wall projecting generally upwardly and away from said base; said wall of said receptacle including an outwardly projecting flange formed at least about a portion of a circumference of said wall;

(b) a sieve disposed within said receptacle, said sieve having a plurality of openings sized for allowing particulates to pass therethrough while preventing solid waste from said animal from passing therethrough; said sieve including at least one handle to facilitate removal from and insertion into said receptacle; said sieve being configured to permit placement of said sieve in said receptacle to a location in close proximity to said base of said receptacle when said receptacle contains an animal litter material;

(c) a waste-guiding member adapted to fit over a portion of said wall to define an opening through which said animal may deposit waste; said waste-guiding member having an intermediate portion, an upwardly projecting portion coupled with said intermediate portion, an inwardly directed flange coupled with said upwardly projecting portion and extending about at least a portion of a circumference of said upwardly projecting portion, an upper portion extending from said intermediate portion opposite of said upwardly projecting portion and a downwardly projecting wall depending from said upper portion; and said outwardly directed flange of said wall cooperating to releasably, lockably engage with said inwardly projecting flange of said waste-guiding member to thereby releasably, lockably secure said waste-guiding member to said wall.

2. The apparatus of claim 1, wherein said waste-guiding member comprises:

a first portion and a second portion; and wherein said receptacle includes a pair of hinges secured thereto, each one of said hinges being secured to one of said first and second portions to allow said first and second portions to be pivotally lifted away from said wall of said receptacle to thereby permit said sieve to be lifted outwardly of said receptacle.

3. The apparatus of claim 1, wherein said base of said receptacle includes a plurality of feet for elevationally supporting said receptacle above a rest surface.

4. The apparatus of claim 3, wherein said feet include means for securing said receptacle to said rest surface.

5. The apparatus of claim 1, wherein said wall includes an indicator of a maximum level to which said receptacle may be filled with said animal litter material.

6. The apparatus of claim 1, wherein said sieve comprises:
   (1) a plurality of cross members; and
   (2) a plurality of generally circular wires supported on said cross members and fixedly secured to said cross members to form a rigid, unitary member.

7. The apparatus of claim 6, wherein said openings comprise a radial distance of about 2.5 centimeters to about 0.25 centimeters between adjacent ones of said generally circular wires.

8. The apparatus of claim 1, wherein said sieve is formed from a single length of wire in the shape of a spiral; and
   wherein a radial distance between radially adjacent portions of said single length of wire comprises a distance of between about 2.5 centimeters to about 0.25 centimeters.

9. A method for disposing of an animal waste, comprising the steps of:
   (a) providing a receptacle for receiving an animal litter material, said receptacle having a base, and a wall surrounding said base and projecting generally away from said base;
   (b) filling said receptacle with a predetermined amount of said animal litter material, said animal litter material including a plurality of particulates;
   (c) then placing a sieve in said receptacle so that said sieve nestably rests in said receptacle in close proximity to said base of said receptacle, said sieve having a predetermined configuration defining a space sufficient to permit said particulates to pass through said sieve, but to restrict a solid waste containing material from passing therethrough, said sieve having an outer periphery, an overall configuration and dimensions that permit said sieve to rest in said receptacle so that the outer periphery of said sieve is in close proximity to said wall of said receptacle;
   (d) after an animal has deposited an animal waste onto said animal litter material, removing said sieve from said receptacle, wherein upon removal of said sieve, a waste containing material is removed from said receptacle, leaving in said receptacle substantially all of said animal litter material that has not come into contact with said animal waste; and
   (e) returning said sieve generally to its approximate position resulting from said placing step (c), without the need to remove said animal litter material from said receptacle, by rotating the sieve about an axis generally normal to said base of said receptacle.

10. The method of claim 9, further comprising the step of defining a maximum level within said receptacle to which said animal litter material is filled.

11. The method of claim 9, further comprising the step of disposing a waste-guiding apparatus over said receptacle to define an opening for allowing said animal to deposit said animal waste into said receptacle.

12. The method of claim 11, wherein the step of disposing a waste guiding apparatus comprises hingedly securing a first, semi-circular shaped waste-guiding member to said wall and hingedly securing a second waste-guiding member to said wall.

13. The method of claim 9, further comprising releasable securing said base of said receptacle to a floor for preventing sliding of said receptacle along said floor.

14. An apparatus for disposing of a waste from an animal, comprising:
   (a) a receptacle for receiving an animal litter material having a base and a wall surrounding said base and projecting generally away from said base; and
   (b) a generally circular sieve being adapted to rest in said receptacle, said sieve dimensioned such that said sieve substantially conforms to the dimension of said base, said sieve being capable of being placed into said receptacle by rotation of said sieve about an axis generally normal to said base of said receptacle when said receptacle contains an animal litter material; and a handle extending from said sieve, and extending above said animal litter material when said sieve is placed in said receptacle, such that said handle may be readily grasped and rotated or vibrated to enable ingress and egress of said sieve.

15. The apparatus of claim 14, further comprising a waste-guiding member adapted to fit over said wall of said receptacle for defining an opening through which said animal may deposit said waste.

16. The apparatus of claim 15, wherein said waste-guiding member includes an inwardly disposed flange extending about at least a portion of its circumference, and wherein said receptacle further includes an outwardly directed radial flange extending along at least a portion of the circumference of said receptacle, said inwardly disposed flange of said waste-guiding member being adapted to snappingly engage with said outwardly directed radial flange of said receptacle to thereby releasably secure said waste-guiding member to said receptacle.

17. The apparatus of claim 14, wherein said sieve includes at least one handle secured thereto for allowing said sieve to be lifted out of said receptacle without requiring a hand to be placed within said animal litter material.

18. The apparatus of claim 14, wherein said receptacle further comprises a plurality of feet projecting from said base for supporting said receiving means elevationally above a rest surface.

19. An apparatus for disposing of a waste from an animal, comprising:
   (a) a receptacle for receiving an animal litter material having a base and a wall surrounding said base and projecting generally away from said base; and
   (b) a generally circular sieve being adapted to rest in said receptacle, said sieve being capable of being placed into said receptacle by rotation of said sieve about an axis generally normal to said base of said receptacle when said receptacle contains an animal litter material; and a member extending from said sieve, and extending above said animal litter material when said sieve is placed in said receptacle, such that said member may be readily grasped and rotated or vibrated to enable ingress and egress of said sieve relative to said receptacle.

20. An apparatus for disposing of a waste from an animal, comprising:
   (a) a receptacle for receiving an animal litter material having a base and a wall surrounding said base and projecting generally away from said base;
   (b) a sieve being adapted to rest in said receptacle, said sieve being capable of being placed into said receptacle by rotation of said sieve about an axis generally normal to said base of said receptacle when said receptacle contains an animal litter material; and
   (c) a waste-guiding member adapted to fit over said wall of said receptacle for defining an opening through which said animal may deposit said waste, said waste-guiding member including a first semi-circular portion, a second semi-circular portion, and said receptacle further including at least one hinge secured to said wall and to at least one of said first and second semi-circular portions for allowing said at least one of said first and second semi-circular portions to be lifted pivotally up and away from said wall of said receptacle.

21. An apparatus for disposing of a waste from an animal, comprising:
   (a) a receptacle for receiving an animal litter material having a base and a wall surrounding said base and projecting generally away from said base;
   (b) a sieve being adapted to rest in said receptacle, said sieve being capable of being placed into said receptacle by rotation of said sieve about an axis generally normal to said base of said receptacle when said receptacle contains an animal litter material, said sieve including at least one handle secured thereto for allowing said sieve to be lifted out of said receptacle without requiring a hand to be placed within said animal litter material; and
   (c) a waste-guiding member adapted to fit over said wall of said receptacle for defining an opening through which said animal deposits said waste; said waste-guiding member including an intermediate portion, an outwardly projecting portion depending from said intermediate portion, an upper portion extending from said intermediate portion and a downwardly projecting wall depending from said upper portion, said intermediate portion, said upper portion and said downwardly projecting wall forming a cavity within which a portion of said handle may be disposed when said waste-guiding member is disposed on said receptacle.

* * * * *